US 8,275,842 B2

Sep. 25, 2012

(12) United States Patent
Ngan

(10) Patent No.: US 8,275,842 B2
(45) Date of Patent: Sep. 25, 2012

(54) SYSTEM AND METHOD FOR DETECTING CONTENT SIMILARITY WITHIN EMAIL DOCUMENTS BY SPARSE SUBSET HASHING

(75) Inventor: Tsuen Wan Ngan, Los Angeles, CA (US)

(73) Assignee: Symantec Operating Corporation, Mountain View, CA (US)

( * ) Notice: Subject to any disclaimer, the term of this patent is extended or adjusted under 35 U.S.C. 154(b) by 682 days.

(21) Appl. No.: 12/059,148

(22) Filed: Mar. 31, 2008

(65) Prior Publication Data

US 2009/0089384 A1    Apr. 2, 2009

Related U.S. Application Data

(60) Provisional application No. 60/976,454, filed on Sep. 30, 2007.

(51) Int. Cl.
   *G06F 15/16* (2006.01)
(52) U.S. Cl. ......... 709/206; 709/204; 713/176; 715/229
(58) Field of Classification Search ........... 709/204–207
   See application file for complete search history.

(56) References Cited

U.S. PATENT DOCUMENTS

| 5,999,932 | A | 12/1999 | Paul |
| 6,052,709 | A | 4/2000 | Paul |
| 6,487,644 | B1 | 11/2002 | Huebsch et al. |
| 6,654,787 | B1 | 11/2003 | Aronson et al. |
| 2004/0064737 | A1 | 4/2004 | Milliken |
| 2005/0086520 | A1 | 4/2005 | Dharmapurikar |
| 2005/0108339 | A1 | 5/2005 | Gleeson et al. |
| 2005/0108340 | A1 | 5/2005 | Gleeson et al. |
| 2005/0132197 | A1* | 6/2005 | Medlar ......................... 713/176 |
| 2006/0041590 | A1* | 2/2006 | King et al. ................. 707/104.1 |

(Continued)

FOREIGN PATENT DOCUMENTS

GB    2400933    10/2004

OTHER PUBLICATIONS

U.S. Appl. No. 10/117,065, entitled "Apparatus and Method for Weighted and Aging Spam Filtering Rules", by Paul, et al., filed Apr. 4, 2002.

(Continued)

*Primary Examiner* — Ian N Moore
*Assistant Examiner* — Jackie Zuniga
(74) *Attorney, Agent, or Firm* — Meyertons, Hood, Kivlin, Kowert & Goetzel, P.C.

(57) ABSTRACT

Systems and methods for detecting content similarity in email documents are disclosed. In one embodiment, a method comprises generating a first token value for each of a plurality of character sequences of a first email document, selecting a first subset of the plurality of character sequences based on the first token values, and generating one or more hash values corresponding to the selected first subset of character sequences. The method further comprises generating a second token value for each of a plurality of character sequences of a second email document, selecting a second subset of the plurality of character sequences based on the second token values, and generating one or more hash values corresponding to the selected second subset of character sequences. The method additionally comprises comparing the one or more hash values corresponding to the selected first subset with the one or more hash values corresponding to the selected second subset.

19 Claims, 8 Drawing Sheets

U.S. PATENT DOCUMENTS

2006/0149820 A1* 7/2006 Rajan et al. .................... 709/206
2006/0288076 A1 12/2006 Cowings et al.
2008/0059590 A1 3/2008 Sarafijanovic

OTHER PUBLICATIONS

U.S. Appl. No. 10/871,583, entitled "System and Method for Filtering Spam Message Utilizing URL Filtering Module", by Cowings, et al., filed Jun. 17, 2004.

U.S. Appl. No. 10/949,465, entitled "System and Method for Filtering Fraudulent Messages", by Bruno, et al., filed Sep. 24, 2004.

U.S. Appl. No. 11/048,958, entitled "Method and Apparatus for Determining the Source of an Email Message", by Mantel, filed May 11, 2005.

U.S. Appl. No. 11/116,572, entitled "Method and Apparatus for Creating Aggressive Anti-Spam Rules", by Cowings, et al., filed Mar. 27, 2005.

U.S. Appl. No. 11/127,813, entitled "Method and Apparatus for Simulation End User Responses to Spam Email Messages", by Khalsa, et al., filed Feb. 1, 2005.

U.S. Appl. No. 11/127,814, entitled "Method and Apparatus for Detecting Spam in Email Messages and Email Attachments", by Cowings, et al., filed May 11, 2005.

JupiterOnlineMedia "What is message digest?—A Word Definition From the Webopedia Computer Dictionary", dated Mar. 12, 2002, downloaded from the Internet "http://www.webopedia.com/TERM/M/message_digest.html" on Sep. 28, 2007, 4 pages.

Yang, H. and Callan, J. "Near-duplicate detection for eRulemaking" Proceedings of the 2005 National Conference on Digital Government Research (Atlanta, Georgia, May 15-18, 2005), ACM International Conference Proceeding Series, vol. 89. Digital Government Society of North America, pp. 78-86.

Nevin Heintze, "Scalable document fingerprinting", Proceeding of the 1996 USENIX Workshop on Electronic Commerce, 1996.

Broder, et al "Syntactic clustering of the Web", Selected papers from the sixth international conference on World Wide Web, p. 1157-1166, Sep. 1997, Santa Clara, California, United States.

Schleimer, et al. "Winnowing: local algorithms for document fingerprinting", Proceedings of the 2003 ACM SIGMOD international conference on Management of data, Jun. 9-12, 2003, San Diego, California.

U.S. Appl. No. 12/142,546, entitled "Methods for Efficiently Finding Email Inclusions" by Johnny Ngan, filed Jun. 19, 2008.

U.S. Appl. No. 12/059,176, entitled "System and Method for Detecting Email Content Containment" by Bunker, et al, filed Mar. 31, 2008.

U.S. Appl. No. 12/059,130, entitled System and Method for Detecting Content Similarity Within Emails Documents Employing Selective Truncation, by Tsuen Wan Ngan, filed Mar. 31, 2008.

U.S. Appl. No. 11/157,327, entitled "Method and Apparatus to Group Spam Email Messages" by Sanford Jensen, filed Jun. 20, 2005.

Wikipedia "Bloom Filter" downloaded from the Internet: URL: http://en.wikipedia.org/wiki/Bloom_filter> retrieved on Jul. 31, 2009.

* cited by examiner

From: John　　　　　　　　　　　　To: Jane

Subject: Fox

The quick brown fox jumped over the lazy dog.

301A

From: Jane　　　　　　　　　　　　To: John

Subject: Fox

The brown fox jumped over the dog.

John　　　　　　　　　　　　Jane

Fox

The quick brown fox jumped over the lazy dog.

301A

Jane　　　　　　　　　　　　John

Fox

The brown fox jumped over the dog.

| Token | Words |       |
|-------|-------|-------|
| 47    | John  |       |
| 25    | Jane  |       |
| 45    | Fox   |       |
| 33    | The   |       |
| 61    | Quick | From Email Document 301A |
| 74    | Brown |       |
| 45    | Fox   |       |
| 68    | Jumped|       |
| 60    | Over  |       |
| 33    | The   |       |
| 64    | Lazy  |       |
| 26    | Dog   |       |

| Token | Words |       |
|-------|-------|-------|
| 25    | Jane  |       |
| 47    | John  |       |
| 45    | Fox   |       |
| 33    | The   |       |
| 74    | Brown | From Email Document 301B |
| 45    | Fox   |       |
| 68    | Jumped|       |
| 60    | Over  |       |
| 33    | The   |       |
| 26    | Dog   |       |

*FIG. 5B*

| Word | Token/Value | Remainder | |
|------|-------------|-----------|---|
| John | $^{47}/_{10}$ | 7 | |
| Jane | $^{25}/_{10}$ | 5 | |
| Fox | $^{45}/_{10}$ | 5 | |
| The | $^{33}/_{10}$ | 3 | |
| Quick | $^{61}/_{10}$ | 1 | From Email Document 301A |
| Brown | $^{74}/_{10}$ | 4 | |
| Fox | $^{45}/_{10}$ | 5 | |
| Jumped | $^{68}/_{10}$ | 8 | |
| Over | $^{60}/_{10}$ | 0 | |
| The | $^{33}/_{10}$ | 3 | |
| Lazy | $^{64}/_{10}$ | 4 | |
| Dog | $^{26}/_{10}$ | 6 | |

| Word | Token/Value | Remainder | |
|------|-------------|-----------|---|
| Jane | $^{25}/_{10}$ | 5 | |
| John | $^{47}/_{10}$ | 7 | |
| Fox | $^{45}/_{10}$ | 5 | |
| The | $^{33}/_{10}$ | 3 | |
| Brown | $^{74}/_{10}$ | 4 | From Email Document 301B |
| Fox | $^{45}/_{10}$ | 5 | |
| Jumped | $^{68}/_{10}$ | 8 | |
| Over | $^{60}/_{10}$ | 0 | |
| The | $^{33}/_{10}$ | 3 | |
| Dog | $^{26}/_{10}$ | 6 | |

*FIG. 6*

| Tokens | Words | | Tokens | Words |
|---|---|---|---|---|
| 25 | Jane | | 25 | Jane |
| 45 | Fox | | 45 | Fox |
| +45 | Fox ⎬ 710A | | +45 | Fox ⎬ 710C |
| hash value = 115 | | | hash value = 115 | |

| Tokens | Words | | Tokens | Word |
|---|---|---|---|---|
| 74 | Brown | | 74 | Brown ⎬ 710D |
| +64 | Lazy ⎬ 710B | | + | |
| hash value = 138 | | | hash value = 74 | |

*FIG. 9*

SYSTEM AND METHOD FOR DETECTING CONTENT SIMILARITY WITHIN EMAIL DOCUMENTS BY SPARSE SUBSET HASHING

This application claims priority to U.S. provisional patent application Ser. No. 60/976,454, entitled "System And Method For Detecting Content Similarity Within Emails Documents by Selective Hashing", filed Sep. 30, 2007.

BACKGROUND OF THE INVENTION

1. Field of the Invention

This invention relates to email systems, and more particularly to the detection of content similarities within email documents.

2. Description of the Related Art

Frequently, it is desired to efficiently find similar emails located in a database. Often, emails may be near duplicates because an email is forwarded or replied to without much added text. However, searching through an extensive database and comparing emails to determine potentially similar emails can be a problematic process. One approach is to compute a hash value from the content of differing emails, and then comparing the hash values for equality. Unfortunately, such approaches would typically only identify emails that are exact duplicates, since any differences in the emails would typically result in the generation of different hash values. Another possible approach is to compare every word of an email against the words of another to determine similarity. However, such an approach is typically very computationally intensive.

SUMMARY

Systems and methods for detecting content similarity in email documents are disclosed. In one embodiment, a method comprises generating a first token value for each of a plurality of character sequences of a first email document, selecting a first subset of the plurality of character sequences based on the first token values, and generating one or more hash values corresponding to the selected first subset of character sequences. The method further comprises generating a second token value for each of a plurality of character sequences of a second email document, selecting a second subset of the plurality of character sequences based on the second token values, and generating one or more hash values corresponding to the selected second subset of character sequences. The method additionally comprises comparing the one or more hash values corresponding to the selected first subset with the one or more hash values corresponding to the selected second subset.

In some embodiments, selecting the first and second subsets of character sequences includes applying a function such as modular arithmetic to each of the token values and selecting particular character sequences based on a result. In various embodiments, a similarity indication is provided in response to the comparing of the one or more hash values.

BRIEF DESCRIPTION OF THE DRAWINGS

FIG. 3 depicts content of two exemplary emails.

FIG. 4 depicts the two exemplary emails with extraneous content removed.

FIG. 5A depicts an example of tokenizing two words.

FIG. 5B depicts a list of tokenized words from the two exemplary emails.

FIG. 6 depicts a list of remainders calculated from the two exemplary emails.

FIG. 9 depicts exemplary hashed subsets.

Figure 1:
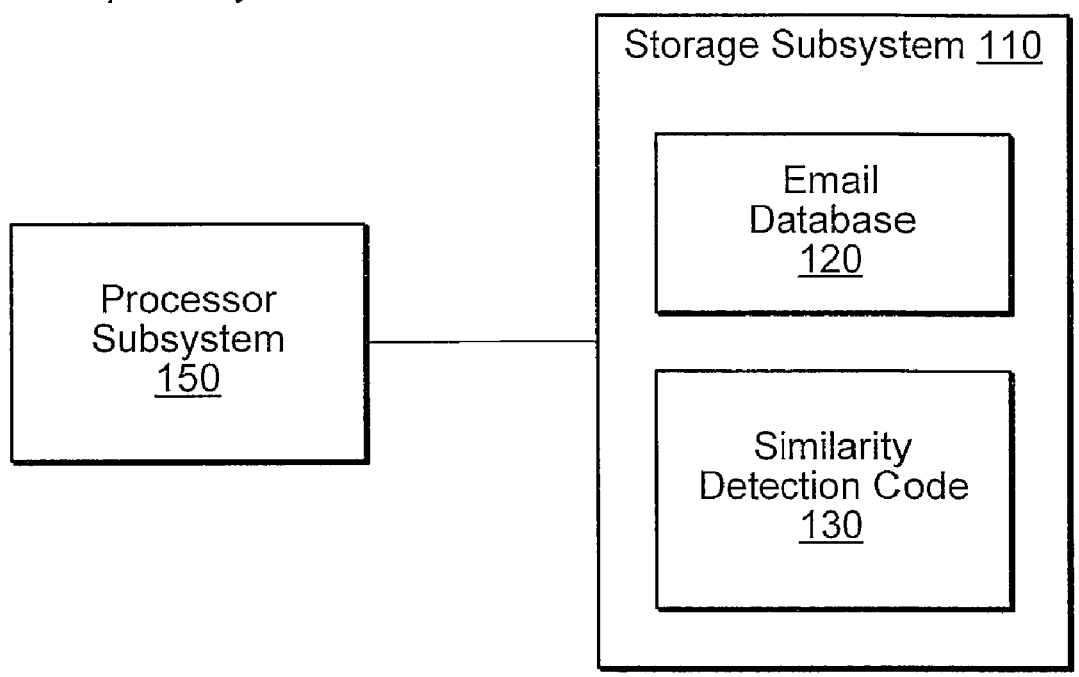
FIG. 1 is a block diagram of a computer system including an email database and similarity detection code.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a computer system 100 is shown. Computer system 100 includes a storage subsystem 110 coupled to a processor subsystem 150. Storage subsystem 110 is shown storing an email database 120 and similarity detection code 130. Computer system 100 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 100 may also be any type of networked peripheral device such as storage devices, switches, modems, routers, etc. Although a single computer system 100 is shown in FIG. 1, system 100 may also be implemented as two or more computer systems operating together.

Processor subsystem 150 is representative of one or more processors capable of executing similarity detection code 130. Various specific types of processors may be employed, such as, for example, an x86 processor, a Power PC processor, an IBM Cell processor, or an ARM processor.

Storage subsystem 110 is representative of various types of storage media, also referred to as "computer readable storage media." Storage subsystem 110 may be implemented using any suitable media type and/or storage architecture. For example, storage subsystem 110 may be implemented using storage media such as hard disk storage, floppy disk storage, removable disk storage, flash memory, semiconductor memory such as random access memory or read only memory, etc. It is noted that storage subsystem 110 may be implemented at a single location or may be distributed (e.g., in a SAN configuration).

Email database 120 contains a plurality of email messages, each referred to herein as an email document, associated with one or more email system users. It is noted that various email documents within email database 120 may be a duplicate of one another or may contain substantially similar content to that of other emails in the database (e.g., an initial email and a corresponding response email containing the initial email).

As will be described in further detail below, similarity detection code 130 includes instructions executable by processor subsystem 150 to identify email documents in database 120 that may be similar to one another (i.e., contain similar content). In various embodiments, email documents identified by similarity detection code 130 as being potentially similar may be reported to a user. In some embodiments, emails identified as being potentially similar may be further evaluated. For example, upon identification, potentially similar email documents may be analyzed or compared by additional code to determine and/or verify the extent of their similarity. Execution of similarity detection code 130 may allow efficient filtering of dissimilar email documents within email database 120.

Figure 2:
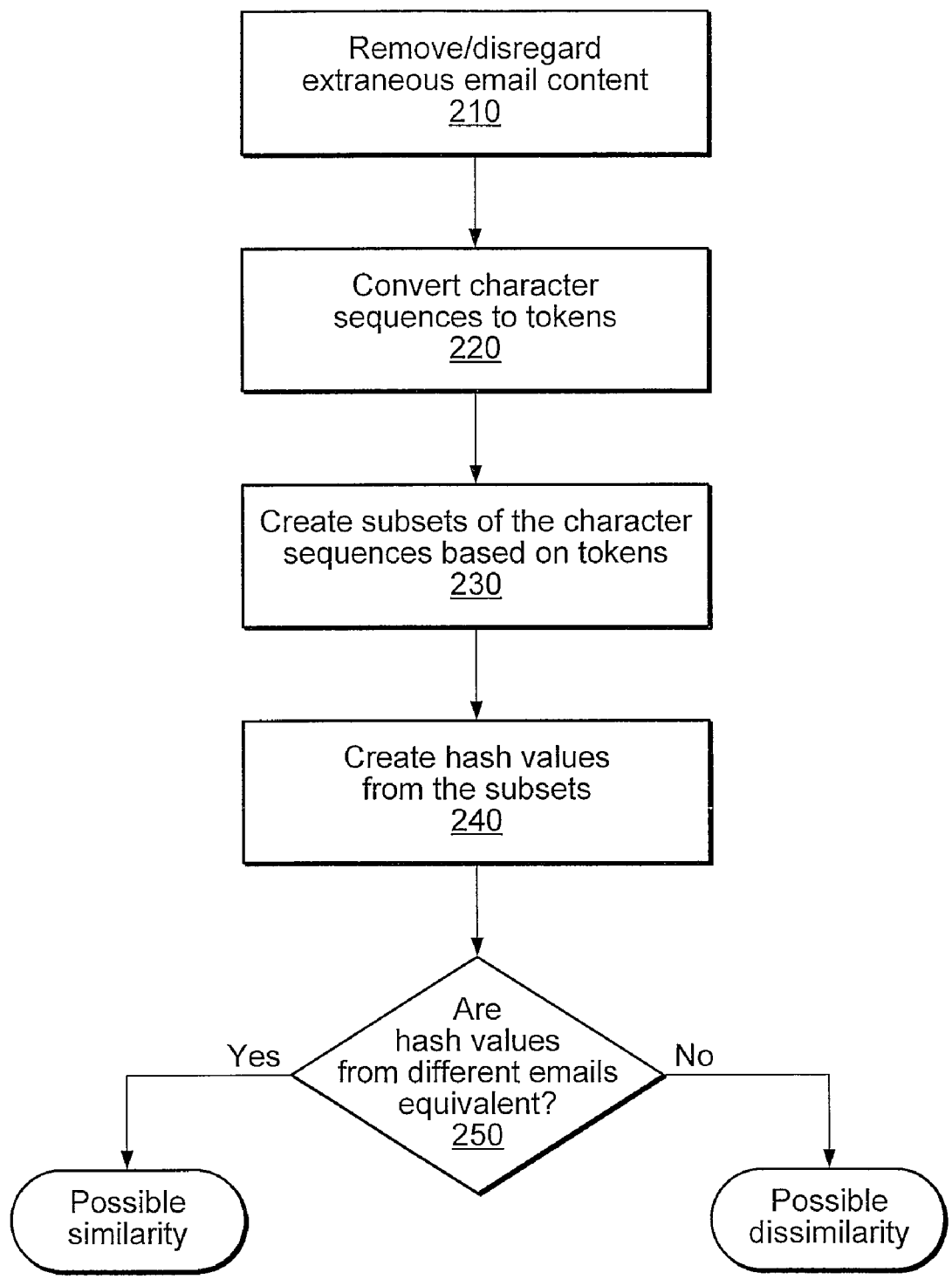
FIG. 2 is a flowchart of one embodiment of a method to detect content similarity in email documents.

FIG. 2 is a flow diagram illustrating operations that may be carried out in accordance with execution of one embodiment of similarity detection code 130. Operations illustrated in FIG. 2 will be discussed in conjunction with an exemplary situation illustrated by FIG. 3, which shows content of two possible email documents 301A and 301B. As shown, email documents 301A and 301B are very similar; however, there are some differences that exist (e.g., the words "quick" and "lazy" in email document 301A do not appear in the body of email document 301B, and the sender and receivers are swapped).

In step 210, extraneous email content in an email document being processed is removed or disregarded. This extraneous content may include common, reoccurring phrases found in typical email documents such as, "On [DATE], at [TIME], [NAME] wrote:", "Begin forwarded message:", "-----Original Message-----", etc. An example of a result from this step is depicted in FIG. 4, where common headings "From:", "To:", and "Subject:" are removed/disregarded for email documents 301A and 301B. In various embodiments, the extraneous email content removed/disregarded from each email document during step 210 may be predetermined or pre-selected words or phrases (e.g., phrases generally common to email documents). In other embodiments, the extraneous email content that is removed/disregarded may be controlled or specified by input from a user. It is noted that in some embodiments step 210 may be omitted.

In step 220, the remaining content within the email documents being processed are converted to token values. A token, as described in this disclosure, is a numerical value representative of or generated from a sequence of selected characters (e.g., a word, a sentence, a paragraph, or portion of a word). For example, FIG. 5A illustrates an example of generating token values according to one embodiment. In this example, the character sequences "John" and "Jane" are converted to the token values "47" and "25" by summing the alphabetic positions of characters in the words. For example, the character "J" is the $10^{th}$ letter in the alphabet and the character "o" is the $15^{th}$ letter. In the depicted embodiment, to determine a value for the word "John" these letter positions are summed creating the numerical value 47. Token values for other words (e.g., "Jane") are created in a similar manner. FIG. 5B illustrates exemplary token values that may be generated for each of the words found in email documents 301A and 301B.

It is noted that token values may be generated in a variety of other ways during step 220. For example, in one alternative embodiment, ASCII character ordinal values, which associate numerical values with alphabetic characters or symbols, may be summed to create a token value for each word (in a similar manner as the embodiment described above). In further embodiments, other predetermined functions (e.g., hash functions), as desired, may be applied to values corresponding characters of a character sequence. It is noted that in some embodiments, the sequential ordering of characters in a character sequence may affect the value of a generated token value. For example, in such embodiments the word "top" may result in generation of a token value that is different from that generated from the word "pot."

Figure 7:
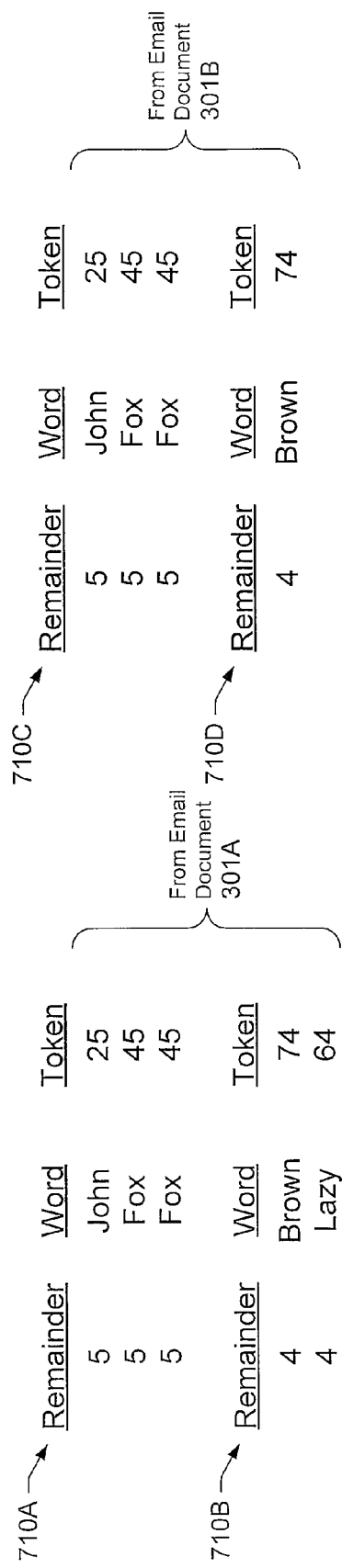
FIG. 7 depicts exemplary subsets with common remainders.
Figure 8:
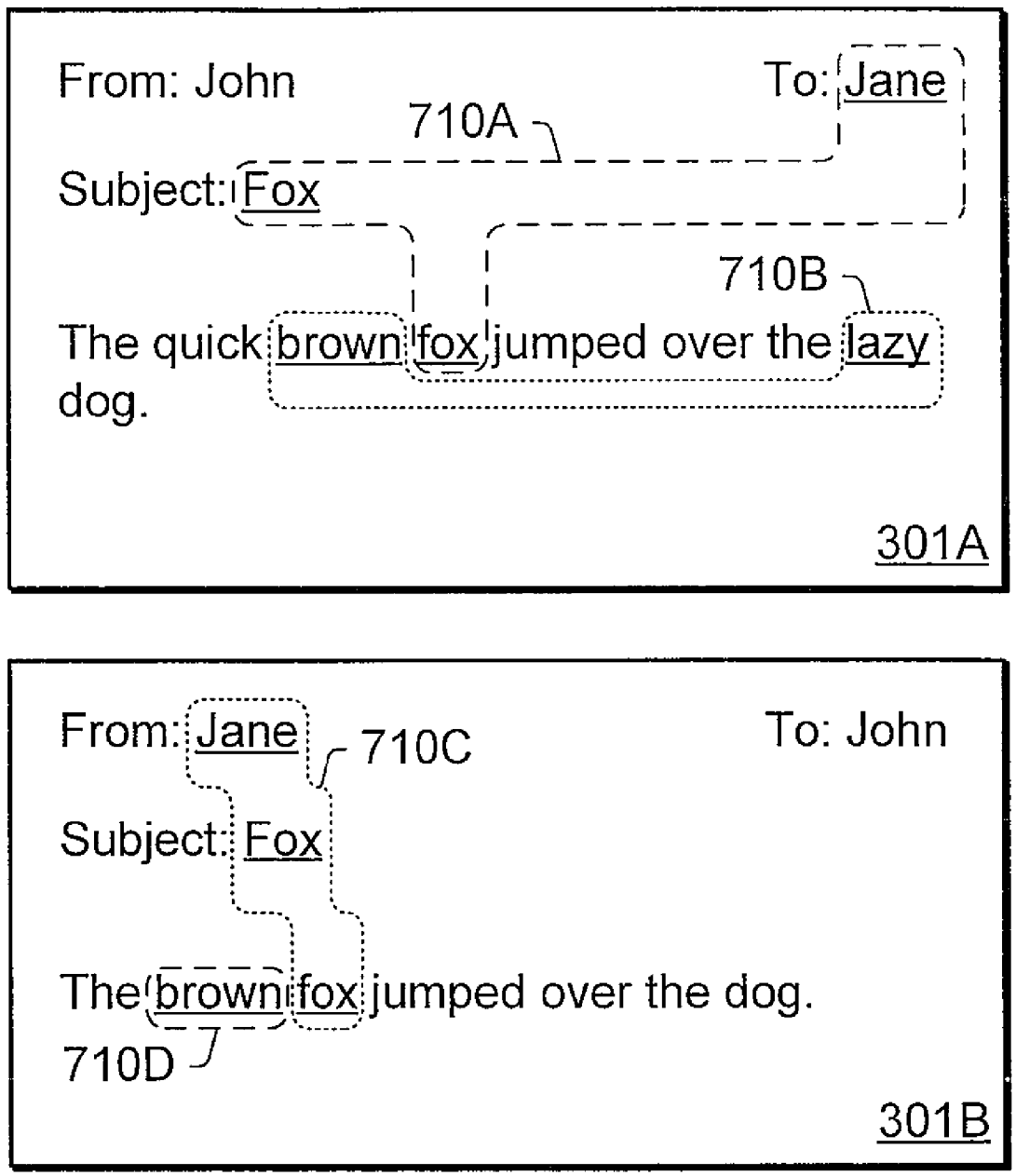
FIG. 8 depicts the exemplary subsets in the content of the two exemplary emails.

In step 230, subsets of the character sequences within the email document being processed are created based on their representative token values. In one embodiment, token values are divided by a predetermined value and grouped into subsets based on common remainder values. FIG. 6 illustrates such an example where remainders are calculated from the tokens generated for email documents 301A and 301B. In this example, the token values for John (47) and Jane (25) are divided by a value 10 (this value corresponds to the number of desired subsets and can be any number) to yield the remainders 7 and 5, respectively. Remainders for the other tokens associated with email documents 301A and 301B are similarly calculated, as illustrated. Following this operation, particular character sequences (e.g., words in this example) are selected for grouping into subsets based on the remainder values. FIG. 7 illustrates an example in which subsets are formed by selected words that resulted in remainder values of 5 and 4. As shown, subsets 710A and 710B correspond to email document 301A, and subsets 710C and 710D correspond to email document 301B. This example is further illustrated in FIG. 8 where subsets 710 A, B, C, and D are circled within email documents 301A and 301B. As depicted, subsets 710A and 710C contain the same words, while subsets 710B and 710D do not.

In step 240, hash values are generated for each of the subsets of words that are formed in step 230. FIG. 9 illustrates a simple example in which the token values (as generated in step 220) of words within each subset are summed to create a hash value. In various embodiments, other hash functions may be used such as an MD5 hash, a SHA-1 hash, etc to create a hash value for each subset. Generally speaking, a "hash function" is any function that has a mapping of an input to a number (i.e., hash value). Accordingly, in some embodiments, the hash value generated for each subset of selected words may be based upon a function that is independent of the token values generated in step 220.

In step 250, the hash values generated in step 240 are compared for equivalency. As shown in FIG. 9, subsets 710A and 710C have the same content, and thus an equivalent hash value (e.g., "115" in this example) was generated for each. On the other hand, subsets 710B and 710D do not contain the same content, and thus different hash values (e.g., "138" and "74", respectively) were generated. Based on this hash value comparison, a similarity indication is generated.

It is noted that similarity detection code 130 may generate the similarity indication in a variety of ways. In some embodiments, the similarity indication may indicate that the email documents being analyzed are similar (or possibly similar) if any hash values resulting from the subsets of selected words in the different documents match. In other embodiments, the similarity indication may indicate that a similarity exists only when at least a threshold ratio of hash-matches to hash-mismatches occurs. In yet other embodiments, the similarity indication may indicate that a similarity exists only if all hash values generated for the subsets of one document match respective hash values generated for the subsets of the other document. In various embodiments, similarity detection code 130 may be programmable by a user who can specify by input a minimum threshold level of hash values that must match to cause an indication of similarity to be output. It is noted that the similarity indication may alternatively indicate that a dissimilarity exists between documents based on the result of the comparison performed in step 250.

Although in the embodiment described above token values and subsets are generated on a word-by-word basis, other embodiments are also possible. For example, tokens and subsets may be created for other predetermined sequences of characters, such as each sentence, paragraph, or any other grouping of characters. It is noted that the term "character" as used herein is not limited to a letter; it may include numbers, symbols, punctuation, etc. Thus, in some embodiments, token values may be generated for character sequences that include punctuation or other symbols.

In various other embodiments, subsets may be created in step 230 using different techniques. For example, in one embodiment, rather than dividing a token value and grouping words into subsets based on common remainder values, other modular arithmetic functions may be applied. In yet other embodiments, other methodical functions may be applied to the tokens to yield subsets based on resultant values (e.g. generating a subset based on odd numbered token values).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for detecting content similarity in email documents comprising:
    generating a token value for each of a plurality of character sequences of a first email document;
    generating a remainder value for each of the plurality of character sequences of the first email document by dividing each of the token values by a predetermined integer value;
    selecting a first subset of the plurality of character sequences of the first email document, wherein the first subset includes character sequences that have the same remainder values;
    selecting a second subset of the plurality of character sequences of the first email document, wherein the second subset includes character sequences that have the same remainder values, and wherein the remainder values of the second subset are different than the remainder values of the first subset;
    generating a first hash value corresponding to the selected first subset of character sequences;
    generating a second hash value corresponding to the selected second subset of character sequences; and
    comparing the first and second hash values with one or more hash values generated from a second email document.

2. The method of claim 1 further comprising disregarding predetermined content from the first email document when selecting the first and second subsets.

3. The method of claim 2, wherein the predetermined content includes email header information.

4. The method of claim 1, further comprising generating a similarity indication in response to the comparing.

5. A non-transitory computer-readable medium storing program instructions that are computer-executable to:
    generate a token value for each of a plurality of character sequences of a first email document;
    generate a remainder value for each of the plurality of character sequences of the first email document by dividing each of the token values by a predetermined integer value;
    select a first subset of the plurality of character sequences of the first email document, wherein the first subset includes character sequences that have the same remainder values;
    select a second subset of the plurality of character sequences of the first email document, wherein the second subset includes character sequences that have the same remainder values, and wherein the remainder values of the second subset are different than the remainder values of the first subset
    generate a first hash value corresponding to the selected first subset of character sequences;
    generate a second hash value corresponding to the selected second subset of character sequences; and
    compare the first and second hash values with one or more hash values generated from a second email document.

6. The non-transitory computer-readable medium of claim 5, wherein the program instructions are further executable to generate a similarity indication in response to comparing the first and second hash values with the one or more hash values generated from the second email document.

7. The non-transitory computer-readable medium of claim 5, wherein the program instructions are executable to generate a similarity indication in response to a predetermined ratio of hash value matches to hash value mismatches.

8. The non-transitory computer-readable medium of claim 5, wherein the program instructions are executable to generate a similarity indication in response to a user-specified threshold level of matching hash values.

9. The non-transitory computer-readable medium of claim 5, wherein the first and second hash values are generated using an MD5 or SHA-1 hashing algorithm.

10. The non-transitory computer-readable medium of claim 5, wherein the plurality of character sequences includes words, and wherein the token values includes token values that-correspond to each of the words.

11. The non-transitory computer-readable medium of claim 5, wherein a given one of the token values is generated based on ASCII ordinal values of each character in a character sequence.

12. The non-transitory computer-readable medium of claim 5, wherein a given one of the token values is generated based on character positions of each character in a character sequence.

13. A system for detecting content similarity in email documents comprising:
    one or more processors; and
    memory storing program instructions that are executable by the one or more processors to:
        generate a token value for each of a plurality of character sequences of a first email document;

generate a remainder value for each of the plurality of character sequences of the first email document by dividing each of the token values by a predetermined integer value;

select a first subset of the plurality of character sequences of the first email document, wherein the first subset includes character sequences that have the same remainder values;

select a second subset of the plurality of character sequences of the first email document, wherein the second subset includes character sequences that have the same remainder values, and wherein the remainder values of the second subset are different than the remainder values of the first subset;

generate a first hash value corresponding to the selected first subset of character sequences;

generate a second hash value corresponding to the selected second subset of character sequences; and compare the first and second hash values with one or more hash values generated from a second email document.

14. The system of claim 13, wherein the program instructions are executable to disregard predetermined content from the first email document when selecting the first and second subsets.

15. The system of claim 14, wherein the predetermined content includes email header information.

16. The system of claim 13, wherein the program instructions are further executable to generate a similarity indication in response to the first and second hash values matching one or more hash values generated from the second email document.

17. The system of claim 13, wherein the program instructions are further executable to generate a similarity indication in response to a predetermined ratio of hash value matches to hash value mismatches.

18. The system of claim 13 wherein the program instructions are further executable to generate a similarity indication in response to a user-specified threshold level of matching hash values.

19. The system of claim 13, wherein the program instructions are further executable to generate a similarity indication in response to the first and second hash values not matching one or more hash values generated from the second email document.

* * * * *